United States Patent Office 3,017,238
Patented Jan. 16, 1962

3,017,238
METHOD FOR SOLVENT SPINNING POLYOLEFINS
Max Levine, Cleveland Heights, and Beryl M. Kuhn, Rocky River, Ohio, assignors, by mesne assignments, to Hercules Powder Company, Wilmington, Del., a corporation of Delaware
No Drawing. Filed Apr. 7, 1960, Ser. No. 20,568
8 Claims. (Cl. 18—54)

This invention relates to an improved method for spinning polymeric materials; more particularly it relates to an improved method for solvent spinning crystallizable, linear, poly-α-olefin materials.

In addition to being relatively inexpensive, crystallizable, linear poly-α-olefin materials possess many desirable physical properties including excellent abrasion resistance, tenacity, and resistance to fatigue; such materials have, and the like, as well as in other industries in the manufacture of filamentary articles such as fibers, filaments, and the like, as well as in other industries in the production of numerous other extruded shapes.

Melt extrusion, which consists in first melting and then extruding polymeric materials into articles possessing the desired shape, is one method commonly employed for fabricating shaped articles from poly-α-olefin materials. Due to the high molecular weight of poly-α-olefin materials, however, and their correspondingly high viscosities, it is frequently necessary to degrade the polymers when melt extrusion is to be employed in order that they can be processed in standard extrusion equipment. Unfortunately, degradation of the polymers results in a general deterioration of their physical properties and is, therefore, undesirable. In addition, when such polymers are melt extruded at a speed higher than a certain critical velocity, melt fracture, which can be defined as a roughness in the extrudate, occurs.

The disadvantages encountered in melt extrusion enumerated above can be overcome, however, through the use of an extrusion method, commonly known as solvent extrusion or solvent spinning, which consists in dissolving the polymer in a solvent, extruding the solution into the desired shape, and subsequently removing the solvent from the polymer. In addition to eliminating the difficulties inherent in melt extrusion, solvent spinning, which is performed at a temperature substantially lower than melt spinning, permits inclusion in the polymer of additive materials such as heat sensitive pigments, polymer antioxidants, and the like which are difficult, if not impossible, to add in a melt spinning process.

Many substances have been suggested for use in solvent spinning poly-α-olefin materials. Included among the solvent materials which have thus been suggested are, for instance, various fractions of petroleum, petroleum jelly, paraffin, toluene, xlyene, tetrahydronaphthalene, decahydronaphthalene, mixtures of diphenol and diphenol ether; halogenated hydrocarbons such as tetrachloroethane, chlorobenzene, orthodichlorobenzene, alpha-chloronaphthalene and ethylene dibromide; ketones such as methyl ethyl ketone, cyclopentanone, and cyclohexanone; alcohols such as cetyl alcohol, and cyclohexanol; esters such as butyl acetate, and isoamylacetate; glycols such as ethylene glycol, diethylene glycol, triethylene glycol, and butylene glycol, and miscellaneous materials such as nitrobenzene, benzonitrile and thiophene. Many of the foregoing solvent materials are difficult to remove completely from the extruded articles, however, and since many of those which are difficult to remove also have objectionably strong odors, the use of such solvents is undesirable. In addition, a considerable number of these solvents are quite limited in their ability to dissolve poly-α-olefins, some being unable to dissolve more than 20% of the polymer by weight. Comparatively large amounts of solvent must, therefore, be used in a process employing such solvents, and since the solvents are, in many cases, relatively expensive, they must be recovered. Furthermore, the presence of large quantities of many of these solvents creates a hazard, due to their flammable and toxic nature, which it is desirable to avoid.

Now a method has been found which permits the use of relatively inexpensive solvents for solvent spinning crystallizable, linear, poly-α-olefin materials. The solvents taught have unusual solvent capacity with respect to such polymeric substances, and large amounts of the latter may, therefore, be dissolved in relatively small amounts of the former. The solvents discovered are relatively nonflammable, and nontoxic, and their odors are comparatively unobjectionable. In addition, the use of such solvents permits filamentary and other shaped articles to be prepared from high molecular weight, high intrinsic viscosity polymers thus making possible the production of articles with improved physical properties.

In accordance with this invention, polymers formed by polymerising alpha-olefins are dissolved in fatty acids such as saturated fatty acids having the general formula $C_nH_{2n+1}COOH$, where $n$ is any integer from 4 to 18, inclusive, or in unsaturated fatty acids having the general formulae $C_nH_{2n-1}COOH$, or $C_nH_{2n-3}COOH$, in which $n$ is any integer from 10 to 24, inclusive, or in mixtures of fatty acids having the above formulae. The solution of polyolefin and acid is subsequently extruded into the dedesired shape and the poly-α-olefin precipiated therefrom.

A simplified flow diagram of the process is as follows:

```
Dissolving poly-α-olefin material in a
fatty acid selected from the group con-
sisting of fatty acids having the general
formula CnH2n+1COOH, in which n is
an integer from 4 to 18, inclusive;
CnH2n-1COOH, in which n is an integer
from 10 to 24, inclusive; CnH2n-3COOH,
in which n is an integer from 10 to 24,
inclusive; and mixtures of fatty acids
having said formula;
```
↓
```
Extruding the resulting solution into
shaped articles
```
↓
```
Eliminating a substantial amount of
the fatty acid contained by said shaped
articles
```

While the invention is not conditioned on the theory, it is believed that these compounds, i.e., fatty acids of the type contemplated by the invention, are operative as solvents in the process because of their unique molecular configuration. One end of the operative solvent molecules consists of an unblocked, carbon-chain organic portion which appears to have a particular affinity for polymers formed from alpha-olefins thus enabling the latter to be dissolved in the former. Located at the opposite end of the molecule is a carboxyl group which, although it has little or no solvency power of its own, assists in the removal of the solvent from the poly-α-olefins. The necessity for employing as a solvent material a compound having at least one unblocked portion which possesses an affinity for poly-α-olefins is demonstrated by the fact that acids containing two carboxyl groups fail to disclose a solvent action for the poly-α-olefins irrespective of the length of the carbon atom chain in such acids if the carboxyl groups are located at each end of, thus blocking, the carbon chain. Indeed, investigation has shown that acids containing chains even 20 carbons long are inoperative insofar as solvent action for poly-α-olefins is concerned if the ends are thus blocked.

The poly-α-olefin material to be processed is mixed and heated with the selected fatty acid or fatty acid mixture until solution of each in the other is accomplished, and the resulting solution is extruded into various shaped articles such as, for instance, filamentary articles, i.e., fibers, filaments and the like, or other shapes. The solution may be extruded in air and subsequently passed through an acid eliminating liquid bath, or the extrusion can take place directly under the surface of such a bath. The bath liquid may consist either of an acid extracting solvent which has no appreciable solvent action on the poly-α-olefin, or, alternatively, it may be a solution of an acid neutralizing base compound dissolved in an aqueous medium such as water. Following neutralization or extraction of the acid by the bath, impurities such as acid salts and excess base, or excess solvent are removed from the extruded articles. The acid salts and base compounds, found in articles treated in a neutralizing bath, are removed by washing the articles while excess solvent, present when an extracting bath has been employed, can be eliminated by drying the articles. Advantageously, when the articles produced are filamentary in character, they are stretched to increase their strength; such a stretching may be applied at any point in the process following formation of the articles.

In compounding the solution of poly-α-olefin in acid, the poly-α-olefin material, conveniently, in a relatively small, subdivided form such as a powder, granules, etc., is mixed into the fatty acid, and the mixture is stirred and simultaneously heated until solution of the poly-α-olefin has been accomplished. The poly-α-olefin can, of course, be added to acids which have been preheated, and with certain types of acids, i.e., those having freezing points above room temperature, preheating of the acid to at least its melting temperature prior to addition of the poly-α-olefin is highly advantageous. If desired, suitable antioxidants and/or various pigments such as, for instance, color pigments may be conveniently added during the mixing process, or they can be introduced after solution of the poly-α-olefin and acid has been accomplished.

The types of fatty acids which have been found to be operable in the invention include saturated fatty acids having the general formula $C_nH_{2n+1}COOH$, in which $n$ is an integer from 4 to 18, inclusive; unsaturated fatty acids having the general formulae $C_nH_{2n-1}COOH$, wherein $n$ is any integer from 4 to 24, inclusive, and $C_nH_{2n-3}COOH$, in which $n$ is an integer from 4 to 24, inclusive; and mixtures of acids having the above formulae. Examples of suitable acids are, for instance, fatty acids such as lauric, myristic, palmitic, stearic, oleic, tallow, coconut, tall oil and the like, various hydrogenated acids including hydrogenated tallow, coconut and tall oil acids, and mixtures of such acids. Particular advantages, however, have been found in the use of stearic acid; tallow acid, the acid mixture derived from tallow which consists primarily of lauric and other saturated acids with minor amounts of oleic and linoleic acids; and coconut acid, the acid mixture obtained from coconut oil which is comprised of acids similar to those contained in tallow acid but in somewhat different amounts. In the preferred embodiment of the invention tall oil acid, and acid mixture produced from tall oil, a by-product of the sulfate process for making kraft paper, and consisting mainly of palmitic, oleic, and linoleic acid, is employed.

The acid-polymer spin solution may be extruded into air and subsequently passed through an acid eleminating bath, or it may be extruded directly into such a bath through a spinneret located beneath the bath's surface. Spin solutions containing at least about 40% by weight of polymer which are extruded into fluid mediums such as water, air, and the like, maintained at ordinary room temperature, solidify upon cooling into relatively stable shapes. Shaped articles formed from solutions having such polymer concentrations may, therefore, be stored, if desired, following extrusion into a fluid medium having a temperature no higher than the freezing temperature of such a solution before being processed through an acid eliminating bath. In the concentrations taught (infra) for practicing the invention, the extrusion temperature of the solution, advantageously, is maintained at from about 130° C. to about 250° C. Particular advantages are realized, however, when the temperature at which the extrusion is carried out is the lowest temperature necessary to attain a polymer viscosity suitable for standard extrusion equipment at the particular concentration of poly-α-olefin being used. While the concentration of polymer present in the solution can be varied within wide limits, advantageously, such solutions should contain more than about 10%, by weight, of polymer, and particular advantages are realized when the solutions contain from at least about 15% to about 95%, by weight, of poly-α-olefin.

Several types of baths suitable for eliminating fatty acids from poly-α-olefins have been found. One type which has proven successful consists of a solution of an acid neutralizing base material and an aqueous liquid such as water. An advantage of this type of bath is that an opportunity is provided to recover and sell the by-product soap formed during the neutralization thereby offsetting a portion of the processing costs. Although any basic compound such as, for instance, potassium hydroxide, sodium hydroxide, etc. capable of solution in an aqueous medium and of neutralizing the fatty acid may be employed in such a bath, certain advantages are realized if sodium hydroxide is so employed. It has been determined that the concentration of base in the bath should be from at least about 0.1% to no more than about 20%, on a weight basis, however, a concentration of from at least about 1% to no more than about 10%, by weight, is preferred. Considerable latitude may be exercised in choosing the temperature at which the bath is to be maintained, although, advantageously, the temperature is kept high enough (at least about 50° C.) to keep the soap formed during the neutralization dispersed, and particular advantages have been found when the solution is maintained at least at about 80° C. The residence time of the shaped article in the bath should be long enough to allow penetration of the article by the bath liquid and neutralization of the desired amount of acid therein, and since penetration depends on the physical characteristics of the shaped article such as thickness, density and the like, as well as on the temperature and concentration of the bath and similar considerations, the optimum residence time must be determined experimentally. Such a determination can easily be made by simple experimentation and observation of the process at the particular conditions desired.

A bath containing a solvent for the fatty acid rather than an aqueous basic solution may also be used to eliminate the acid from the poly-α-olefin. Suitable solvents include various ethers such as ethyl ether, dioxane, etc., alcohols such as methyl alcohol, ethyl alcohol, isopropyl alcohol and the like, ketones as, for instance, methyl ethyl ketone, acetone, methyl isobutyl ketone, etc., esters including methyl acetate, ethyl acetate, and other suitable organic solvent compounds, and mixtures of the foregoing solvents. Although in the practice of the invention the temperature of the solvent in the bath will depend upon the solvent used, the concentration of acid present, etc., and can be varied through a wide range, relatively warm baths result in faster, more complete elimination of the acid present in the polyolefin. Care must be exercised in this regard, however, so that the temperature will not be so high that an appreciable amount of solvent is lost through evaporation. The residence time of the shaped article in the extraction bath should be long enough to allow penetration of the article by the bath liquid and extraction of the desired amount of acid therefrom. As in the case of the neutralization bath, the proper residence time can be easily determined by simple experimentation under the process conditions to be employed.

Irrespective of which type of bath is used for acid elimination, a substantial amount of acid should be eliminated from the shaped article, i.e., enough acid should be eliminated so that the poly-α-olefin present in the final product represents at least about 40% of the article's weight, and particular advantages are realized if at least about 90%, by weight, of the finished shaped article is poly-α-olefin.

Following treatment of the shaped articles in the bath, at least about 75% by weight of the bath introduced impurities such as bath constituents, neutralization products, and the like should be removed from the articles; advantageously, however, substantially all such impurities are removed. In the case of extruded articles which have been processed through a neutralization bath, excess base and the salts formed during neutralization may be removed by washing the articles with water. Additional advantages are realized, however, when a multi-step washing process consisting of a water wash, succeeded by a wash with a dilute acid solution such as, for instance, a 0.5% to 5.0%, by weight, solution of sulfuric acid in water, and followed finally by a wash with hot water is used. Where the extruded articles have been processed in a solvent bath, the excess solvent retained in the articles after the latter have been withdrawn from the bath may be removed by a drying step performed by passing the articles through a heated tube; over a hot, self-advancing reel, drum, and the like; or in other various ways.

In the case of poly-α-olefin filamentary articles such as fibers, filaments and the like, increased strengths are realized if the latter are stretched and their crystals thereby oriented. Stretching may be performed at any point in the process such as, in the case of an extrusion into air, while the filaments are leaving the extruder; or it can be done in the bath; during washing; or before or after drying; etc. In addition, stretching can take place in a series of separate stretches, i.e., part may be done in the bath and part during washing, and so on. The mechanics of stretching may be accomplished in any of the well-known ways as, for instance, over pins, between reels, and in similar ways.

The invention is effective in the case of polymers formed from alpha-olefin monomers, and particularly so in the case of polymers formed from alpha-olefin monomers having the formula R—CH=CH$_2$, in which R is either a hydrogen atom or 1 to 10 carbon atoms (the carbon atoms being arranged in a linear, branched, or cyclic fashion), inclusive, or mixtures of such monomers. Examples of suitable monomers are, for instance, ethylene, propylene, 3 methyl-1-butene, styrene, vinylcyclohexane, 4 methyl-1-pentene, 3 cyclohexyl-1-propene, 3 cyclopentyl-1-propene, allyl benzene, 4 phenyl-1-butene and 5 methyl-1-hexene. Particular advantages, however, have been found in the use of stereo-regulated monomers of the above types, and in the preferred embodiment of the invention, stereo-regulated polypropylene is employed.

The following examples, while not intended to be limiting in nature, are illustrative of the invention.

*Example I*

A solution is prepared by dispersing 1,000 parts, by weight, of polypropylene, having an intrinsic viscosity as defined below of 3.9, in 1,000 parts of tall oil acid and simultaneously heating and stirring the mixture until it reaches a temperature of 180° C. The solution is then extruded, as filaments, into air at a rate of approximately 50 meters per minute. The extrusion takes place through a spinneret containing 10 holes, each of which is 150 microns in diameter, and the unitary filaments formed are immediately passed into a solution of sodium hydroxide and water, maintained at 80° C., containing 5% by weight of sodium hydroxide. After substantially complete neutralization of the acid contained in the filaments, the latter are withdrawn from the bath over a self-advancing reel of the type disclosed in U.S. Patent No. 2,210,914, and passed to another, similar reel where they are washed with water. The filaments are subsequently forwarded to other self-advancing reels where they receive an additional wash with a 3%, by weight, solution of sulfuric acid in water, as well as a final wash with 50° C. water. Following washing, the filaments, now substantially free of neutralization salts and sodium hydroxide, are dried by being passed through a steam heated drying tube; wound on bobbins; and subsequently drawn (stretched) approximately 5 times their original length between two self-advancing reels. The filaments produced have a uniform denier, very good physical properties and are particularly easy to fabricate into textile articles.

*Example II*

A solution is prepared by dispersing 1,000 parts, by weight, of polypropylene, having an intrinsic viscosity of 3.9, in 200 parts of oleic acid and simultaneously heating and stirring the mixture until it reaches a temperature of 200° C. The resulting solution is extruded, as filaments, through a spinneret having 10 holes, each hole being 150 microns in diameter, at a rate of approximately 50 meters per minute. The extrusion is performed beneath the surface of a bath of sodium hydroxide dissolved in water, maintained at 80° C., containing 5%, by weight, of sodium hydroxide. Following substantially complete neutralization of the acid in the bath, the filaments are withdrawn and treated as disclosed in Example I.

*Example III*

A solution is prepared by dispersing 1,000 parts, by weight, of polypropylene, having an intrinsic viscosity of 3.9, in 1,000 parts of stearic acid and simultaneously heating and stirring the solution until it reaches a temperature of 180° C. The solution is then extruded, as filaments, through a spinneret having 10 holes, each hole being 150 microns in diameter, at a rate of about 50 meters per minute. The extrusion is carried out beneath the surface of a bath of sodium hydroxide dissolved in water, maintained at 80° C., containing 2%, by weight, of sodium hydroxide. After substantially complete neutralization of the stearic acid contained in the filaments, the latter are withdrawn from the bath, washed in the manner disclosed in the previous examples, and while being washed, the filaments are stretched 5 times their original length between two self-advancing reels. Following washing and stretching, the filaments are dried on heated rolls and wound on a bobbin. The resulting filaments present a pleasing appearance and fabrics made from them have a very good hand.

*Example IV*

A solution is prepared by dispersing 1,000 parts, by weight, of poly (4 methylpentene-1), having an intrinsic viscosity of 3.9, in 1,000 parts of myristic acid and simultaneously heating and stirring the solution until it reaches a temperature of 200° C. The solution is then extruded, as filaments, below the surface of a bath of ethanol maintained at approximately 45° C. The extrusion takes place through a spinneret having 16 holes, each hole being 100 microns in diameter, at a rate of 35 meters per minute. Following substantially complete extraction of the acid from the filaments, the latter are withdrawn from the bath, dried by being passed through a steam heated drying tube, and subsequently stretched 4.5 times their original length between two self-advancing reels before being wound on a bobbin.

*Example V*

A solution is prepared by dispersing 1,000 parts, by weight, of polypropylene, having an intrinsic viscosity of 3.9, in 300 parts of lauric acid and simultaneously stirring and heating the solution until it reaches a temperature of approximately 190° C. The solution is then extruded, as filaments, through a spinneret having 10 holes, each hole being 150 microns in diameter, at a rate of about 25 meters per minute. The extrusion is carried out beneath the surface of a bath of potassium hydroxide dissolved in water, maintained at 80° C., containing 5%, by weight, of potassium hydroxide. During extrusion, the filaments are drawn 5 times their original length before being withdrawn from the bath over a self-advancing reel. After leaving the bath, the filaments are passed to another self-advancing reel where they are washed with hot water until substantially free from potassium laurate and potassium hydroxide. The filaments are then dried by being passed over a heated drum and wound on a bobbin. The filaments, besides having good physical properties and denier uniformity, are particularly easy to process into textile articles.

The presence of a relatively small amount of fatty acid in filaments made from poly-α-olefins of the type contemplated by the invention is sometimes desirable since it tends to act as a lubricant during subsequent textile operations. While filaments made by the process of the invention contain some residual fatty acids due to incomplete neutralization in the bath, advantageously, a relatively small amount of acid may be deliberately left in the filaments for lubrication purposes. Such a result can be obtained by controlling the amount of acid eliminated from the filaments in the bath. Varying degrees of acid elimination are achieved through adjustment of process variables such as the residence time of the filaments in the bath and/or by the adjustment of bath conditions such as, for instance, bath temperature, concentration of base present (in the case of neutralizing baths), and the like. Alternatively, an acid and poly-α-olefin spin solution containing the amount of fatty acid desired for lubrication purposes may be extruded and processed without being treated in an acid eliminating bath. In either case, particularly good lubrication results when at least about 5%, by weight, of acid is left in the filaments.

Intrinsic viscosity, which is considered to reflect polymer chain length (the higher the intrinsic viscosity the greater the chain length), may be defined as that value which is obtained by extrapolating to 0 concentration the ratio of the specific viscosity of the solution to the concentration, in weight percent, of the poly-α-olefin.

What is claimed is:

1. A process for producing shaped poly-α-olefin articles comprising the steps of dissolving poly-α-olefin material in a fatty acid selected from the group consisting of fatty acids having the general formulae:

$$C_nH_{2n+1}COOH$$

wherein $n$ is an integer from 4 to 18, inclusive;

$$C_nH_{2n-1}COOH$$

in which $n$ is an integer from 10 to 24, inclusive;

$$C_nH_{2n-3}COOH$$

in which $n$ is an integer from 10 to 24, inclusive; and mixtures of fatty acids having said formulae; extruding the resulting solution into shaped articles and eliminating a substantial amount of the fatty acid contained by said articles.

2. A process for producing polypropylene filamentary articles comprising the steps of dissolving polypropylene material in a fatty acid selected from the group consisting of fatty acids having the general formulae:

$$C_nH_{2n+1}COOH$$

where $n$ is an integer from 4 to 18, inclusive;

$$C_nH_{2n-1}COOH$$

in which $n$ is an integer from 10 to 24, inclusive;

$$C_nH_{2n-3}COOH$$

in which $n$ is an integer from 10 to 24, inclusive; and mixtures of fatty acids having said formulae; extruding the resulting solution into filamentary articles; and eliminating a substantial amount of the fatty acid contained by said filamentary articles.

3. A process for producing poly-α-olefin filamentary articles comprising the steps of dissolving poly-α-olefin material formed from alpha-olefins containing 2–10 carbon atoms, inclusive, in tall oil acid and extruding the resulting solution into filamentary articles; neutralizing a substantial amount of the tall oil acid contained by said filamentary articles in a solution comprised of an acid neutralizing base and water; removing, by washing, at least about 75%, by weight, of the neutralization salts and excess neutralizing base from said filamentary articles; drying the washed articles; and stretching said filamentary articles, said stretching being performed at any place in the process subsequent to the formation by extrusion of the filamentary articles.

4. A process for producing poly-α-olefin filamentary articles comprising the steps of dissolving poly-α-olefin material formed from alpha-olefins containing 2–10 carbon atoms, inclusive, in an acid selected from the group consisting of tallow, coconut, stearic, and tall oil acids, hydrogenated tall oil, tallow, and coconut acids, and mixtures of such acids, and extruding the resulting solution into filamentary articles; removing a substantial amount of the acid from said filamentary articles by extracting the acid from said filamentary articles with an acid dissolving solvent; drying the extracted articles; and stretching said filamentary articles, said stretching being performed at any place in the process subsequent to the formation by extrusion of the filamentary articles.

5. A process for producing shaped polypropylene articles comprising the steps of dissolving polypropylene material in a fatty acid selected from the group consisting of fatty acids having the general formulae:

$$C_nH_{2n+1}COOH$$

wherein $n$ is an integer from 4 to 18, inclusive;

$$C_nH_{2n-1}COOH$$

in which $n$ is an integer from 10 to 24, inclusive;

$$C_nH_{2n-3}COOH$$

in which $n$ is an integer from 10 to 24, inclusive; and mixtures of fatty acids having said formulae; extruding the resulting solution into shaped articles; eliminating a substantial amount of the fatty acid contained in said shaped articles in an acid eliminating bath; and subsequently removing at least about 75%, by weight, of the bath introduced impurities from said shaped articles.

6. A process for producing stereo-regulated, polypropylene filamentary articles comprising the steps of compounding a solution of stereo-regulated polypropylene and an acid selected from the group consisting of tallow, coconut, stearic, and tall oil acids, hydrogenated tall oil, tallow, and coconut acids, and mixtures of such acids, said solution containing at least about 15% but no more than about 95%, by weight, of stereo-regulated polypropylene; forming filamentary articles from the solution by extruding said solution into a bath comprising sodium hydroxide and water, said bath containing from at least about 0.1% by weight to no more than about 20% by weight of sodium hydroxide; neutralizing in said bath an amount of the acid such that the stereo-regulated polypropylene constitutes at least about 90%, by weight, of the finished filamentary articles; washing the neutralized articles until substantially all of the neutralization salts and sodium hydroxide have been removed therefrom; drying the washed articles; and stretching said filamentary articles, said stretching being performed at any place in the process subsequent to the formation by extrusion of the filamentary articles.

7. A process for producing stereo-regulated, polypropylene filamentary articles comprising the steps of compounding a solution of stereo-regulated polypropylene and tall oil acid, said solution containing at least about 15%, but no more than about 95%, by weight, of stereo-regulated polypropylene; forming filamentary articles from the solution by extruding said solution into a bath comprised of a tall oil acid dissolving solvent selected from members of the group consisting of ethers, alcohols, ketones, esters, and mixtures of such solvents, capable of solution with tall oil acid; extracting in said bath an amount of tall oil acid such that the stereo-regulated polypropylene constitutes at least about 90%, by weight, of the finished filamentary articles; drying the extracted articles; and stretching said filamentary articles, said stretching being performed at any place in the process subsequent to the formation by extrusion of the filamentary articles.

8. A process for producing stereo-regulated, polypropylene filamentary articles comprising the steps of compounding a solution of stereo-regulated polypropylene and an acid selected from the group consisting of tallow, coconut, stearic, and tall oil acids, hydrogenated tall oil, tallow and coconut acids, and mixtures of such acids, said solution containing at least about 40%, but no more than about 95%, by weight, of stereo-regulated polypropylene; and forming filamentary articles from the solution by extruding the same into a fluid medium maintained at a temperature no higher than the freezing temperature of said solution.

References Cited in the file of this patent
UNITED STATES PATENTS 2,421,627    La Crosse _____ June 3, 1947

FOREIGN PATENTS 1,024,201    Germany _____ Feb. 13, 1958
822,080    Great Britain _____ Oct. 21, 1959

UNITED STATES PATENT OFFICE
CERTIFICATE OF CORRECTION

Patent No. 3,017,238　　　　　　　　　　　　　　January 16, 1962

Max Levine et al.

It is hereby certified that error appears in the above numbered patent requiring correction and that the said Letters Patent should read as corrected below.

Column 1, line 18, for "ments, and the like, as well as in other industries" read -- therefore, been widely used in the textile field --.

Signed and sealed this 8th day of May 1962.

(SEAL)
Attest:

ERNEST W. SWIDER
Attesting Officer

DAVID L. LADD
Commissioner of Patents